(12) United States Patent
Enderle

(10) Patent No.: US 6,367,283 B1
(45) Date of Patent: Apr. 9, 2002

(54) THREE-STAGE ELECTRONICALLY VARIABLE ORIFICE TUBE

(75) Inventor: Brian Enderle, Dublin, OH (US)

(73) Assignee: Ranco Incorporated, Plain City, OH (US)

( * ) Notice: Subject to any disclaimer, the term of this patent is extended or adjusted under 35 U.S.C. 154(b) by 0 days.

(21) Appl. No.: 09/550,377

(22) Filed: Apr. 14, 2000

(51) Int. Cl.$^7$ .............................................. F25B 41/06
(52) U.S. Cl. ..................................................... 62/511
(58) Field of Search ........................ 62/511, 510, 509, 62/498, 222; 251/129.21; 137/513.3

(56) References Cited

U.S. PATENT DOCUMENTS

| | | | |
|---|---|---|---|
| 4,412,432 A | * 11/1983 | Brendel | 62/504 |
| 4,428,718 A | 1/1984 | Skinner | |
| 5,058,395 A | * 10/1991 | Ni et al. | 62/278 |
| 5,332,365 A | 7/1994 | Taguchi | |
| 5,377,498 A | * 1/1995 | Cur et al. | 62/187 |
| 5,454,233 A | * 10/1995 | Naujock | 62/509 |
| 5,620,310 A | 4/1997 | Takenaka et al. | |
| 5,694,781 A | 12/1997 | Peterson | |
| 5,715,704 A | 2/1998 | Cholkeri et al. | |
| 5,732,566 A | * 3/1998 | Choi | 62/324.6 |
| 5,806,324 A | 9/1998 | Shaw | |
| 5,829,264 A | 11/1998 | Ishigaki et al. | |
| 5,873,704 A | 2/1999 | Ota et al. | |
| 6,148,628 A | * 11/2000 | Reason et al. | 62/223 |
| 6,182,457 B1 | * 2/2001 | Enderle | 51/129.2 |
| 6,196,012 B1 | * 3/2001 | Reason et al. | 62/225 |
| 6,226,998 B1 | * 5/2001 | Reason et al. | 62/230 |
| 6,276,154 B1 | * 8/2001 | Pippin | 62/217 |

* cited by examiner

Primary Examiner—Teresa Walberg
Assistant Examiner—Daniel Robinson

(74) Attorney, Agent, or Firm—Porter, Wright, Morris & Arthur

(57) ABSTRACT

A refrigerant flow-control valve is operable between a mid-flow condition, a low-flow condition, and a high-flow condition in response to an electronic control signal supplied thereto and a pressure drop across the valve. The valve includes a tubular-shaped body having an inlet and an outlet and forming a refrigerant passageway extending from the inlet to the outlet, a cylindrically-shaped restrictor secured within the tube and forming a first restriction, a cylindrically shaped end stop secured within the tube and spaced-apart from the restrictor, and a plunger within the tube between the restrictor and the end stop. The plunger forms a first valve-element flow passage between its outer periphery and the tube and carries a first valve element which movable between a first position closing the first valve-element flow passage and a second position opening the first valve-element flow passage. The second restriction has a greater resistance to refrigerant flow than the first restriction. A first biasing member is within the tube and resiliently urges the first valve element into the second position. A Solenoid coil is adapted to selectively move the first valve element to the first position in response to an electronic control signal supplied thereto. The valve also includes a cylindrically-shaped collar secured within the tube and forming a second valve-element flow passage and a poppet within the tube between the restrictor and the collar and carrying a second valve element The poppet is movable between a first position closing the second valve-element flow and a second position opening the second valve-element flow passage. The third restriction has a greater resistance to refrigerant flow than the first restriction and a lesser resistance to flow than the second restriction. A second biasing member within the tube resiliently urges the second valve element into the first position. The poppet is adapted to automatically move the second valve element to the second position in response to a pressure head across the flow-control valve.

22 Claims, 2 Drawing Sheets

THREE-STAGE ELECTRONICALLY VARIABLE ORIFICE TUBE

BACKGROUND OF THE INVENTION

The present invention generally relates to refrigeration systems and, more particularly, to refrigeration systems having flow-control restriction or expansion devices incorporated therein.

A refrigeration system, such as a motor vehicle air conditioner, typically has a closed circuit through which a refrigerant undergoes a thermodynamic cycle. The circuit of a motor vehicle air conditioner typically includes an engine driven semi-hermetic compressor, a condenser connected in series to the compressor, a flow-control restriction or expansion device, which is often referred to as a flow-control valve or expansion valve, connected in series to the condenser, and an evaporator connected in series between the expansion device and the compressor. The compressor raises the pressure of "low-pressure" gaseous refrigerant to a pressure suitable for operation of the condenser. "High-pressure hot" gaseous refrigerant passes from the compressor to the condenser. The condenser condenses the high-pressure hot refrigerant by transferring heat from the refrigerant to the ambient environment or atmosphere located outside the motor vehicle. The expansion device causes the high-pressure liquid refrigerant exiting the condenser to experience a sudden pressure drop, causing the liquid refrigerant to cool and expand (usually a constant enthalpy process). The "low-pressure cold" liquid refrigerant passes to the evaporator where it vaporizes by absorbing heat from surrounding air and as a result cools the surrounding air. Typically, a fan or blower forces air across the evaporator and delivers "cooled" air to a passenger compartment of the motor vehicle. Low-pressure hot gaseous refrigerant exits the evaporator and returns to the compressor and the above-described thermodynamic cycle repeats as the refrigerant flows through the circuit.

Such motor vehicle air conditioning systems can be easily tailored for efficient cooling at specific driving conditions such as, for example, highway driving (constant speed) or city driving (stop and go). When tailored for efficient cooling at one driving condition, however, cooling efficiency can be less than desirable while at other driving conditions. One solution has been to incorporate an expansion valve operable between different flow conditions. For example, U.S. Pat. No. 5,715,704 to Cholkeri et al., which is expressly incorporated herein in its entirety by reference, discloses an electronically-controlled expansion valve which operates in two different flow conditions. The expansion valve is a high/low stage direct controlled solenoid valve. The solenoid operates the expansion valve between a high-flow state providing high or maximum refrigerant flow through the expansion valve and a low-flow state providing low or minimum refrigerant flow through the expansion valve. The solenoid is periodically energized to obtain the low-flow state and de-energized to obtain the high-flow state in response to refrigeration system parameters and/or motor vehicle parameters such as, for example, head pressure, vehicle speed and engine rpm to provide more efficient cooling at various driving conditions.

While refrigeration systems with such expansion valves are effective at providing more efficient cooling at multiple driving conditions, it is desirable to have additional refrigerant flow rates to provide even more efficient operation. Accordingly, there is a need in the art for an improved refrigeration system having a flow-control valve with more than two flow rates.

SUMMARY OF THE INVENTION

The present invention provides a refrigerant flow-control valve operable between a mid-flow condition, a low-flow condition, and a high-flow condition which overcomes at least some of the above-noted problems of the related art. According to the present invention, the refrigerant flow-control valve includes a body having an inlet and an outlet and forming a refrigerant passageway extending from the inlet to the outlet. The passageway has first, second, and third restrictions and first and second valve-element flow passages which are adapted such that refrigerant flows through the first valve-element flow passage generally in parallel with the second restriction, refrigerant flows through the second valve-element passage generally in parallel with the third restriction, and refrigerant flows through the first restriction generally in series with the first valve-element flow passage and the second restriction and generally in series with the second valve-element flow passage and the third restriction. A first valve element is located within the body and is movable between a first position closing the first valve-element flow passage to generally prevent refrigerant flow therethrough and a second position opening the first valve-element flow passage to permit refrigerant flow therethrough. A first biasing member located within the body resiliently urges the first valve element into the second position. A second valve element is located within the body and is movable between a first position closing the second valve-element flow passage to generally prevent refrigerant flow therethrough and a second position opening the second valve-element flow passage to permit refrigerant flow therethrough. A second biasing member located within the body resiliently urges the second valve element into the first position. Constructed in this manner, the first biasing member is preferably adapted to maintain the first valve member in the second position except when a control signal is sent to a valve actuator to overcome the bias of the first biasing member to selectively move the first valve element to the second position. The second biasing member is preferably adapted to maintain the second valve member in the first position except when a predetermined pressure drop across the valve overcomes the bias of the second biasing member to automatically move the second valve element to the first position with fluid pressure.

According to another aspect of the present invention, the present invention provides a refrigerant flow-control valve operable between a mid-flow condition, a low-flow condition, and a high-flow condition The flow-control valve includes a tubular-shaped body having an inlet and an outlet and forming a refrigerant passageway extending from the inlet to the outlet, a cylindrically-shaped restrictor secured within the tube and forming a first restriction, a cylindrically shaped end stop secured within the tube and spaced-apart from the restrictor, and a plunger within the tube at least partially between the restrictor and the end stop. The plunger forms a first valve-element flow passage between the plunger and the tube. The plunger carries a first valve element and is movable between a first position closing the first valve-element flow passage to generally prevent refrigerant flow therethrough and a second position opening the first valve-element flow passage to permit refrigerant flow therethrough. The plunger forms a second restriction generally connected in parallel with the first valve-element flow passage and generally connected in series with the first restriction. The second restriction has a greater resistance to refrigerant flow than the first restriction. A first biasing member is within the tube and resiliently urges the first valve element into the second position. A valve actuator is adapted to selectively move the first valve element to the first position in response to a control signal supplied thereto. The valve also includes a cylindrically-shaped collar secured within the tube and forms a second valve-element flow passage. The collar is spaced-apart from the restrictor. A poppet is within the tube at least partially between the restrictor and the collar and carries a second valve element. The poppet is movable between a first position closing the second valve-element flow passage to generally prevent refrigerant flow therethrough and a second position opening the second valve-element flow passage to permit refrigerant flow therethrough. The poppet forms a third restriction generally connected in parallel with the second valve-element flow passage and is generally connected in series with the first restriction. The third restriction has a greater resistance to refrigerant flow than the first restriction and a lesser resistance to refrigerant flow than the second restriction. A second biasing member is within the tube and resiliently urges the second valve element into the first position. The poppet is adapted to automatically move the second valve element to the second position in response to a pressure head across the flow-control valve.

According to yet another aspect of the present invention, the present invention provides a refrigeration system. The refrigeration system has a compressor, a condenser, and a evaporator connected in series and an expansion valve connected in series between the condenser and the evaporator. The refrigeration system includes a body having an inlet and an outlet and forming a refrigerant passageway extending from the inlet to the outlet. The passageway has first, second, and third restrictions and first and second valve-element flow passages which are adapted such that refrigerant flows through the first valve-element flow passage generally in parallel with the second restriction, refrigerant flows through the second valve-element passage generally in parallel with the third restriction, and refrigerant flows through the first restriction generally in series with the first valve-element flow passage and the second restriction and generally in series with the second valve-element flow passage and the third restriction. A first valve element is located within the body and is movable between a first position closing the first valve-element flow passage to generally prevent refrigerant flow therethrough and a second position opening the first valve-element flow passage to permit refrigerant flow therethrough. A first biasing member located within the body resiliently urges the first valve element into the second position. A second valve element is located within the body and is movable between a first position closing the second valve-element flow passage to generally prevent refrigerant flow therethrough and a second position opening the second value-element flow passage to permit refrigerant flow therethrough. A second biasing member located within the body resiliently urges the second valve element into the first position. Constructed in this manner, the first biasing member is preferably adapted to maintain the first valve member in the second position except when a control signal is sent to a valve actuator to overcome the bias of the first biasing member to selectively move the first valve element to the second position. The second biasing member is preferably adapted to maintain the second valve member in the first position except when a predetermined pressure drop across the valve overcomes the bias of the second biasing member to selectively move the second valve element to the first position with fluid pressure.

According to yet even another aspect of the present invention, the present invention provides a method of delivering refrigerant from a high pressure region to a low pressure region of a refrigeration system through a variable dimension passageway to expands the refrigerant as it enters the low pressure region. The method includes the step of coupling the high and low pressure regions through a valve body having an inlet and an outlet and forming a refrigerant passageway extending from the inlet to the outlet. The passageway has first, second and third restrictions and first and second valve-element flow passages adapted such that refrigerant flows through the first valve-element flow passage generally in parallel with the second restriction, refrigerant flows through the second valve-element flow passage in parallel with the third restriction, and refrigerant flows through the first restriction generally in series with the first valve-element flow passage and the second restriction and generally in series with the second valve-element flow passage and the third restriction. A first valve element is mounted within the valve body such that the first valve element is movable between a first position closing the first valve-element flow passage to generally prevent refrigerant flow therethrough and a second position opening the first valve-element flow passage to permit refrigerant flow therethrough. The first valve element is resiliently biased into the second position and is selectively moved to the first position in response to a control signal supplied thereto. A second valve element is mounted within the valve body such that the second valve element is movable between a first position closing the second valve-element flow passage to generally prevent refrigerant flow therethrough and a second position opening the second valve-element flow passage to permit refrigerant flow therethrough. The second valve element is biased into the first position and is automatically moved to the second position in response to a predetermined fluid pressure acting against the bias at a predetermined "blow-off" pressure.

BRIEF DESCRIPTION OF THE SEVERAL VIEWS OF THE DRAWING

These and further features of the present invention will be apparent with reference to the following description and drawing, wherein.

DETAILED DESCRIPTION OF PREFERRED EMBODIMENTS OF THE INVENTION

Figure 1:
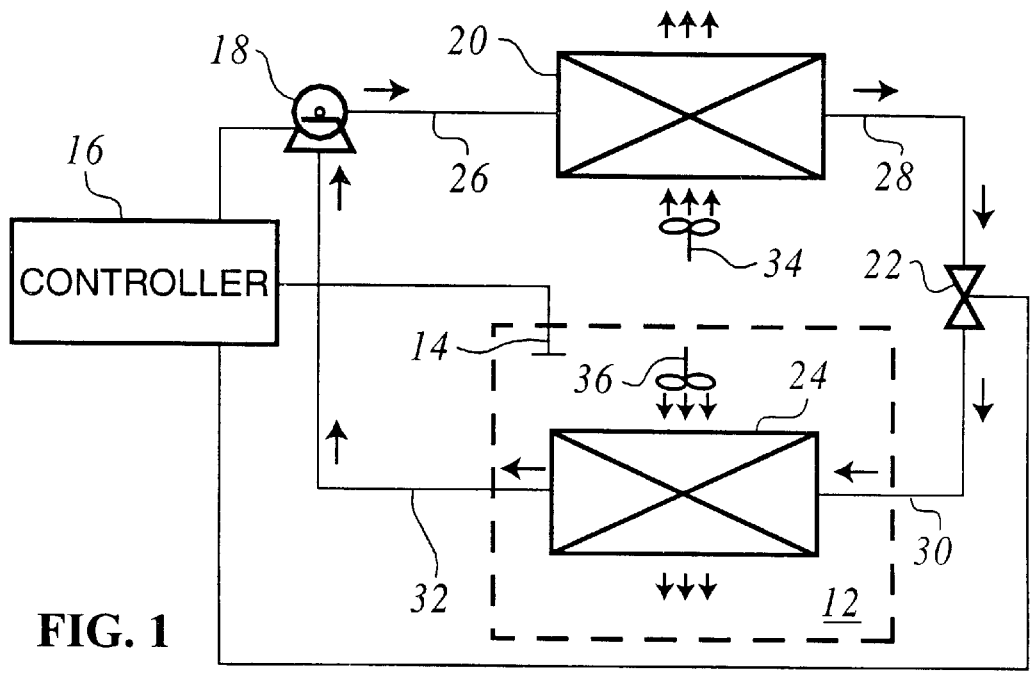
FIG. 1 is a schematic view of a refrigeration system having a refrigerant flow-control valve operable between a low-flow condition, a mid-flow condition, and a high-flow condition according to the present invention.

FIG. 1 schematically illustrates a vapor compression refrigeration system 10 according to the present invention such as, for example, a motor vehicle air conditioner. The motor vehicle refrigeration system 10 transfers heat from air to be directed into an interior or passenger compartment 12 within the motor vehicle to ambient air or atmosphere outside the passenger compartment 12. A temperature sensor 14 can provide temperature signals to a controller 16 for controlling operation of the refrigeration system 10 to maintain the passenger compartment 12 within desired temperature limits.

The refrigeration system 10 includes a closed or sealed circuit having a compressor 18, a first heat exchanger or condenser 20 located downstream from the compressor 18, a flow-control restriction device or expansion valve 22 located downstream from the condenser 20, and a second heat exchanger or evaporator 24 located downstream from the expansion valve 22 and upstream from the compressor 18. A first refrigerant line or conduit 26 connects a discharge or outlet port of the compressor 18 with an inlet port of the condenser 20. A second refrigerant line or conduit 28 connects an outlet port of the condenser 20 with an inlet or upstream end of the expansion valve 22. A third refrigerant line or conduit 30 connects an outlet or downstream end of the expansion valve 22 with an inlet port of the evaporator 24. A fourth refrigerant line or conduit 32 closes the circuit by connecting an outlet port of the evaporator 24 with a suction or inlet port of the compressor 18. Assembled in this manner, the compressor 18, the condenser 20, the expansion valve 22, and the evaporator 24 are connected in series by the refrigerant lines 26, 28, 30, 32. The refrigerant lines 26, 28, 30, 32 can be formed of any suitable material known in the art and can be joined in any suitable manner known in the art. It is noted that the refrigeration system 10 can have additional components within the scope of the present invention such as, for example, another evaporator connected in parallel with the evaporator 24 or another complete refrigeration system connected in series in order to cool different portions of the passenger compartment 12.

A working fluid or refrigerant such as, for example, R134A goes through a thermodynamic cycle as it flows through the closed circuit. The compressor 18 pressurizes the refrigerant and circulates the refrigerant through the circuit. Refrigerant exits the compressor 18 as a vapor at an elevated pressure. Preferably, refrigerant exits the compressor 18 at a pressure at or near an optimum pressure for operation of the condenser 20 but the pressure varies depending on the operating conditions of the motor vehicle. High-pressure refrigerant vapor passes through the first refrigerant line 26 from the compressor 18 to the condenser 20. While passing through the condenser 20, high-pressure refrigerant vapor transfers heat to a heat exchange medium such as, for example, air flowing over the condenser 20. In a motor vehicle application, heat is transferred to ambient atmosphere located outside the passenger compartment 12. Preferably, a blower or fan 34 forces air to flow over the condenser 20. This transfer of heat within the condenser 20 causes refrigerant vapor to condense to liquid. The geometry of the refrigeration system 10 is preferably such that high-pressure refrigerant liquid, substantially at compressor discharge pressure, accumulates at a downstream end of the condenser 20 when the compressor 18 is operating. The condenser 20 continues to transfer heat from accumulated refrigerant liquid so that its temperature drops below the condensation temperature corresponding to the condenser pressure. This refrigerant condition is typically referred to as "subcooled" and the extent of subcooling depends on various operating conditions of the refrigeration system 10.

High-pressure refrigerant liquid exits the condenser 20 and flows through the second refrigerant line 28 to the expansion valve 22. The refrigerant effect of the refrigeration system 10 is altered by adjusting the expansion valve 22 which controls refrigerant flow to the evaporator 24. While passing through the expansion valve 22, high-pressure refrigerant liquid flows through at least one restriction where it undergoes a pressure drop and may partially flash to vapor as it ideally expands and cools in a constant enthalpy process. Pressure of the refrigerant liquid is preferably reduced from at or near optimum condenser pressure at the inlet of the expansion valve 22 to at or near optimum evaporator pressure at the outlet of the expansion valve 22. The expansion valve 22 automatically controls the flow rate of refrigerant from the condenser 20 to the evaporator 24 and automatically varies the flow rate of the refrigerant according a control signal sent thereto and to the pressure of the refrigerant at the inlet and the outlet of the expansion valve 22 (i.e. pressure drop across the expansion valve). The illustrated expansion valve 22 operates in a medium or mid-flow condition (best shown in FIG. 2), a minimum or low-flow condition (best shown in FIG. 3), or a maximum or high-flow condition (best shown in FIG. 4) as described in more detail hereinbelow.

Low-pressure refrigerant liquid-vapor mixture exits the expansion valve 22 and flows through the third refrigerant line 30 to the evaporator 24. While passing through the evaporator 24 in a controlled manner, refrigerant is vaporized. Heat to support vaporization is absorbed from a heat exchange medium such as, for example, air flowing over the evaporator 24 so that the air is cooled. In a motor vehicle application, heat is transferred from air directed to the passenger compartment 12 so that air inside the passenger compartment 12 is cooled as desired. Preferably, a blower or fan 36 forces air across the evaporator 24 and delivers "cooled" air to the passenger compartment 12. Geometry of the refrigeration system 10 is such that low-pressure refrigerant vapor preferably accumulates at the downstream end of the evaporator 24. The evaporator 24 continues to transfer heat to the refrigerant liquid so that its temperature rises above the vaporization temperature corresponding to the evaporator pressure. This refrigerant condition is typically referred to as "superheated" and the extent of superheating depends on various operating conditions of the refrigeration system 10.

Low-pressure refrigerant vapor exits the evaporator 24 and flows through the fourth refrigerant line 32 from the evaporator 24 to the compressor 18. In the compressor 18, refrigerant pressure is again elevated and the above-described thermodynamic cycle repeats as refrigerant continues to circulate through the circuit.

Figure 2:
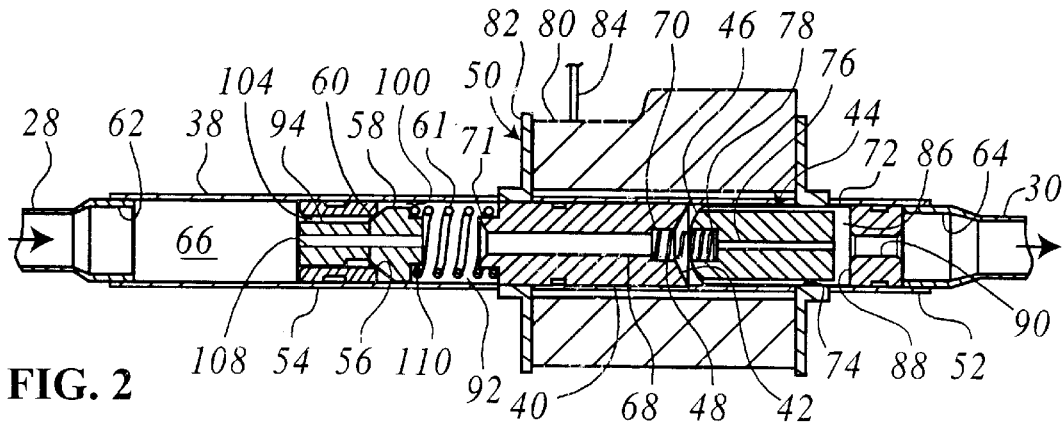
FIG. 2 is a cross-sectional view of the refrigerant-flow control valve of FIG. 1 showing the flow-control valve in the mid-flow condition.
Figure 3:
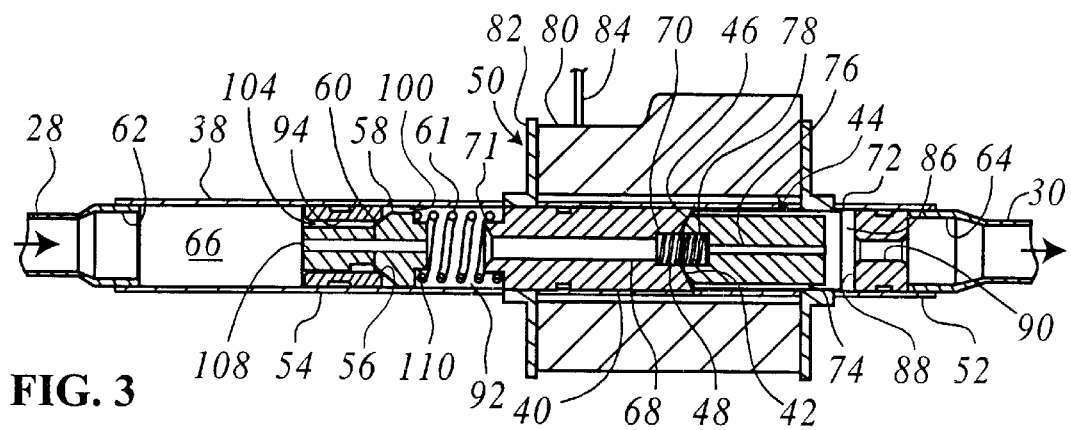
FIG. 3 is a cross-sectional view of the refrigerant flow-control valve of FIGS. 1 and 2 showing the flow-control valve in the low-flow condition.
Figure 4:
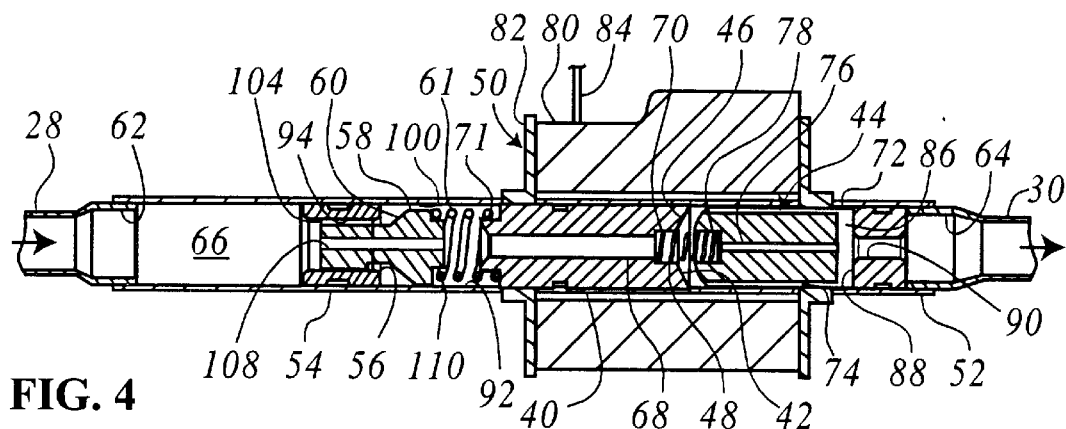
FIG. 4 is a cross-sectional view of the refrigerant flow-control valve of FIGS. 1–3 showing the flow-control control valve in the high-flow or pressure relief condition.

FIGS. 2–4 illustrate a preferred flow-control expansion valve 22 according to the present invention which is particularly adapted for use in a motor vehicle air conditioner. The expansion valve 22 includes a body 38, a restrictor 40 forming a first or plunger valve seat 42, a movable plunger 44 carrying a first or plunger valve element 46, a plunger biasing member 48 for biasing the plunger valve seat 42 and the plunger valve element 46 out of engagement, a valve actuator 50 for moving the plunger 44 to selectively engage the plunger valve seat 42 and the plunger valve element 46, an end stop 52 for limiting movement of the plunger 44, a collar 54 forming a second or poppet valve seat 56, a movable poppet 58 carrying a second or poppet valve element 60, and a poppet biasing member 61 for urging the poppet valve seat 56 and the poppet valve element 60 into engagement.

The body 38 of the illustrated embodiment is a generally straight tube having a circular cross-section but it is noted that the body 38 can be in many other forms within the scope of the present invention, such as an angled tube, a machined housing, or any other suitable form. The body 38 includes a primary or inlet port 62 adapted for connection with the second refrigerant line 28 which delivers refrigerant from the condenser 20 to the expansion valve 22 and a secondary or outlet port 64 adapted for connection with the third refrigerant line 30 which delivers refrigerant from the expansion valve 22 to the evaporator 24. The refrigerant lines 28, 30 are sealingly connected to the inlet and outlet ports 62, 64 in any suitable manner. A passageway 66 extends through the body 38 and connects the inlet port 62 with the outlet port 64 for refrigerant flow therebetween. The body 38 can be formed of any suitable material known by those skilled in the art.

The restrictor 40 is located within the passageway 66 of the body 38 and is generally cylindrically-shaped having an outer surface sized for cooperation with the passageway 66 of the body 38. The outer surface of the restrictor 40 is preferably sized for a "tight" or "interference" fit with the body passageway 66 in a "plug-like" manner for both securing the restrictor 40 in a fixed position within the passageway 66 to prevent relative movement therebetween and sealing the outer surface of the restrictor 40 and the inner surface of the body passageway 66 to prevent refrigerant flow therebetween. It is noted that the restrictor 40 can be secured to the body in additional or other manners such as by, for example, brazing, welding, crimping, mechanically or chemically fastening, or the like and can be sealed using sealants, seals, gaskets or the like. In the illustrated embodiment, the restrictor 40 is generally located near the center of the body 38, upstream of the plunger 44 and the end stop 52, and downstream of the collar 54 and the poppet 58. The restrictor 40 forms a first flow passage which is a first orifice or restriction 68 that axially extends through the restrictor 40 and is generally coaxial with the passageway 66. The first restriction 68 is sized and shaped to restrict and control refrigerant flow through the passageway 66 of the body 38 when the expansion valve 22 is in the high-flow condition as described in more detail hereinbelow. The entrance and exit of the first restriction 68 are preferably expanded such as, for example, by countersinks to improve flow into and out of the first restriction 68. The downstream end of the restrictor 40 is provided with the plunger valve seat 42 adapted to cooperate with the plunger valve element 46 as described in more detail hereinbelow. The downstream end of the restrictor 40 is also preferably provided with a seat 70 for cooperating with the plunger biasing member 48. The illustrated restrictor 40 is provided with a central recess at its downstream end to form the seat 70 which is sized and shaped for receiving and/or supporting an end of the plunger biasing member 48. In the illustrated embodiment the first restriction 68, the plunger valve seat 42, and the plunger biasing member seat 70 are all coaxially formed by the restrictor 40. The upstream end of the restrictor 40 is also preferably provided with a seat 71 for cooperating with the poppet biasing member 61. The illustrated restrictor 40 is provided with a protrusion at its upstream end to form the seat 71 which is sized and shaped for receiving and/or supporting an end of the poppet biasing member 61. The restrictor 40 can be formed of any suitable material known by those skilled in the art.

Figure 5:
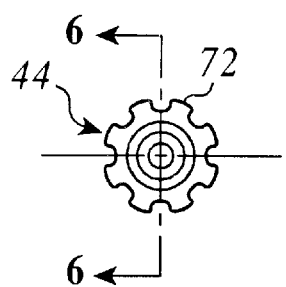
FIG. 5 is an end view of a plunger of the flow-control valve of FIGS. 1–4 showing the upstream end of the plunger.
Figure 6:
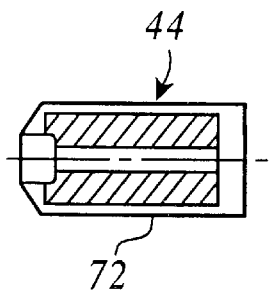
FIG. 6 is a cross-sectional view of the plunger taken along line 6—6 of FIG. 5.
Figure 7:
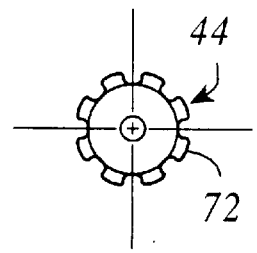
FIG. 7 is an end view of the plunger of FIGS. 5 and 6 showing the downstream end of the plunger.

The plunger 44 is located within the body passageway 66 generally near the outlet port 64 and between the restrictor 40 and the end stop 52. The plunger 44 is adapted for controlled axial movement within the passageway 66 between the restrictor 40 and the end stop 52 and relative to the body 38, the restrictor 40, and the end stop 52. As best shown in FIGS. 5–7, the plunger 44 has a generally cylindrically-shaped bearing surface 72 for supporting the plunger 44 at its outer periphery which is sized and shaped for a close fit and axial movement within the body passageway 66. The bearing surface 72 is adapted to form a second flow passage or plunger-valve flow passage 74 which preferably includes a plurality of axially extending flow paths to permit refrigerant flow between the circumference of the plunger 44 and the inner surface of the body passageway 66 past the entire axial length of the bearing surface 72. In this regard, the illustrated bearing surface 72 is provided with a plurality of circumferentially spaced-apart flutes or open channels 76 which extend the full axial length of the bearing surface 72. It is noted that the bearing surface 72 can be adapted to form the flow paths in other manners such as, for example, a plurality of flat sections or axially extending holes.

The plunger valve element 46 is formed at the upstream end of the plunger 44, that is the end facing the restrictor 40, and is sized and shaped to cooperate with the plunger valve seat 42 of the restrictor 40 to sealingly close the plunger-valve flow passage 74 to prevent refrigerant flow therethrough when the plunger valve element 46 engages the plunger valve seat 42. The illustrated plunger valve element 46 includes a generally frusto-conically-shaped surface at the upstream end of the plunger 44 which is sized for engaging a cooperating frusto-conically-shaped surface of the plunger valve seat 42. It is noted that the cooperating plunger valve seat 42 and plunger valve element 46 can take other forms within the scope of the present invention. It is also noted that the expansion valve 22 can be alternatively designed such that the plunger 44 carries the plunger valve seat 42 and the restrictor 40 forms the plunger valve element 46.

The plunger 44 also forms a third flow passage which is a second orifice or restriction 76 that axially extends through the plunger 44 and is generally coaxial with the passageway 66. The second restriction 76 is sized and shaped to restrict and control refrigerant flow through the passageway 66 of the body 38 when the expansion valve 22 is in the low-flow condition as described in more detail hereinbelow. The upstream end of the plunger 44 is preferably provided with a seat 78 for cooperating with the plunger biasing member 48. The illustrated plunger 44 is provided with a recess at its upstream end to form the seat 78 which is sized and shaped for receiving and/or supporting an end of the plunger biasing member 48. The plunger 44 can be formed of a suitable ferrro-magnetic material which cooperates with the valve actuator 50 as described herinbelow such as, for example, 430 stainless steel.

The illustrated plunger biasing member 48 is located within the body passageway 66 between and engaging the restrictor 40 and the plunger 44. The plunger biasing member 48 is adapted for resiliently biasing or urging the plunger 44 in a downstream direction toward the end stop 52, that is, away from the restrictor 40, to disengage the plunger valve seat 42 and the plunger valve element 46 and open the plunger-valve flow passage 74. The plunger biasing member 48 is preferably a helical coil compression spring but other types biasing means and/or springs can be utilized within the scope of the present invention such as, for example, tension springs, leaf springs, fluid springs, and the like. The plunger biasing member 48 is sized to unseat the plunger valve element 46 when the valve actuator 50 is de-energized but to allow the valve actuator 50 to move the plunger 44 and seat the plunger valve element 46 when valve actuator 50 is energized.

The valve actuator 50 is preferably a solenoid coil 80 supported in a ferromagnetic coil frame 82. The solenoid coil 80 is secured about the body 38 adjacent the plunger 44 so that the solenoid coil 80 cooperates with the plunger 44 to selectively move the plunger 44 against the biasing action of the plunger biasing member 48. The solenoid coil 80 can be a commercially available solenoid which preferably accepts direct current (d.c.) input signals between 9 and 16 volts and draws no more than about 1 ampere of current while moving the plunger 44 to seat the plunger valve element 46. Other suitable solenoids coils 80 can utilized such as, for example, those using alternating current (a.c.) current signals.

The valve actuator 50 preferably has a control-signal input 84 which receives an externally generated control signal from the controller 16 to initiate movement of the plunger 44 to a position for limiting or restricting refrigerant flow through the passageway 66. The illustrated solenoid coil 80 is electrically coupled to the controller 16 which selectively energizes the solenoid coil 80 to set up a magnetic field in the region of the plunger 44 and move the plunger 44 in a upstream direction toward the restrictor 40. When the solenoid coil 80 is de-energized, the magnetic field is removed and the plunger biasing member 48 moves the plunger 44 in a downstream direction away from the restrictor 40. Thus, the illustrated expansion valve 22 requires no control signal to the valve actuator 50 for the expansion valve 22 to be in the mid-flow or high-flow condition but requires a control signal to the valve actuator 50 for the expansion valve 22 to be in the low-flow condition. It is noted that the valve actuator 50 can be alternatively designed to receive a control signal to initiate movement of the plunger 44 to a position not limiting or restricting refrigerant flow through the passageway so that a control signal is sent to the valve actuator 50 for the expansion valve 22 to be in the mid-flow or high-flow conditions but not the low flow condition. It is also noted that the control signal can be pulse width modulated so that the plunger 44 moves back and forth at the frequency of the pulse width modulated control signal. In such a system, greater control over refrigerant flow is maintained.

The controller 16 preferably responds to sensed conditions or parameters of the motor vehicle or the refrigeration system 10 to automatically activate the valve actuator 50 with a control signal and move the position of the plunger 44. Monitored parameters input to the controller 16 can be, for example, engine speed, motor vehicle speed, compressor head pressure, or any other condition which indicates that the refrigerant flow rate should be adjusted. By way of example, engine speed can indicate a need to adjust refrigerant flow rate because compressor speed is reduced at low engine speed. Low compressor speed results in a lower pressure head of refrigerant entering the compressor 18. Reducing refrigerant flow rate through the expansion valve 22 can increase this pressure head. Thus, the expansion valve 22 is advantageously adjusted for lower refrigerant flow rate below a threshold value of engine speed such as, for example, below about 850–900 rpm.

The end stop 52 is located within the passageway 66 of the body 38 and is generally cylindrically-shaped having an outer surface sized for cooperation with the passageway 66 of the body 38. The outer surface of the end stop 52 is preferably sized for a "tight" or "interference" fit with the body passageway 66 in a "plug-like" manner for both securing the end stop 52 in a fixed position within the passageway 66 to prevent relative movement therebetween and sealing the outer surface of the end stop 52 and the inner surface of the body passageway 66 to prevent refrigerant flow therebetween. It is noted that the end stop 52 can be secured to the body in additional or other manners such as by, for example, brazing, welding, crimping, mechanically or chemically fastening, or the like and can be sealed using sealants, seals, gaskets or the like. In the illustrated embodiment, the end stop 52 is located near the outlet port 64 and downstream of the plunger 44. The end stop 52 is spaced apart from the downstream end of the restrictor 40 to form a rear chamber 86 therebetween within the body passageway 66. The end stop 52 forms an abutment 88 facing the plunger 44 and the restrictor 40 which provides an outer limit for movement of the plunger 44 away from the restrictor 40. It is noted that the abutment 88 can be formed in other manners such as, for example, crimping the body 38. The end stop 52 is provided with an axially extending opening 90 which is generally coaxial with the body passageway 66 for passage of refrigerant therethrough. The entrance and exit of the opening 90 is preferably expanded such as, for example, by countersink to improve flow into and out of the opening 90. The end stop 52 can be formed of any suitable known by those skilled in the art.

The collar 54 is located within the passageway 66 of the body 38 and is generally cylindrically-shaped having an outer surface sized for cooperation with the passageway 66 of the body 38. The outer surface of the collar 54 is preferably sized for a "tight" or "interference" fit with the body passageway 66 in a "plug-like" manner for both securing the collar 54 in a fixed position within the passageway 66 to prevent relative movement therebetween and sealing the outer surface of the collar 54 and the inner surface of the body passageway 66 to prevent refrigerant flow therebetween. It is noted that the collar 54 can be secured to the body in additional or other manners such as by, for example, brazing, welding, crimping, mechanically or chemically fastening, or the like and can be sealed using sealants, seals, gaskets or the like. In the illustrated embodiment, the collar 54 is generally located near the inlet port 62 and upstream of the poppet 58 and the restrictor 40. The collar 54 is spaced apart from the restrictor 40 to form a central chamber 92 therebetween within the body passageway 66. The collar 54 forms a fourth flow passage or poppet-valve flow passage 94 which axially extends through the collar 54 and is generally coaxial with the body passageway 66. The poppet-valve flow passage 94 is preferably circular in cross section and is sized and shaped to cooperate with the poppet 58. The exit or downstream end of the poppet-valve flow passage 94 is adapted to form the poppet valve seat 56 for the poppet valve element 60 as described in more detail hereinbelow. The entrance or upstream end of the poppet-valve flow passage 94 is preferably expanded such as, for example, by countersink to improve flow into the poppet-valve flow passage 94. The collar 54 can be formed of any suitable material known by those skilled in the art.

Figure 8:
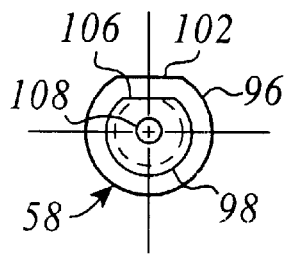
FIG. 8 is an end view of a poppet of the flow-control valve of FIGS. 1–4 showing the upstream end of the poppet.
Figure 9:
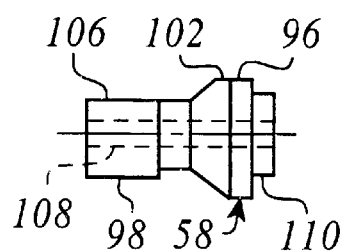
FIG. 9 is a side view of the poppet of FIG. 8.
Figure 10:
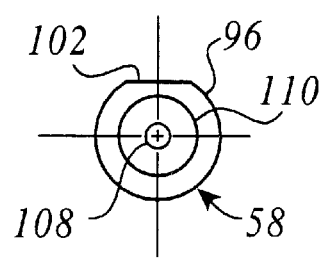
FIG. 10 is an end view of the poppet of FIGS. 8 and 9 showing the downstream end of the poppet.

The poppet 58 is located within the body passageway 66 between the restrictor 40 and the collar 54 and is adapted for axial movement within the passageway 66 relative to the body 38, the restrictor 40, and the collar 54. As best shown in FIGS. 8–10, the poppet 58 has a first generally cylindrically-shaped bearing surface 96 formed near its downstream end which is sized and shaped for a close fit and axial movement within the central chamber 92 of the body passageway 66 and a second generally cylindrically-shaped bearing surface 98 formed near its upstream end which is sized and shaped for a close fit and axial movement within the poppet-valve flow passage 94. The first bearing surface 96 is adapted to form an axially extending flow path 100 (FIG. 2) to permit refrigerant flow between the circumference of the poppet 58 and the inner surface of the body passageway 66 past the first bearing surface 96 when the poppet valve 60 is unseated. In this regard, the illustrated first bearing surface 96 is provided with a flat or straight section 102 which extends the full axial length of the first bearing surface 96. It is noted that the first bearing surface 96 can be adapted to form the flow path 100 in other manners such as, for example, a plurality of flat sections or one or more flutes. The second bearing surface 98 is adapted to form an axially extending flow path 104 (FIG. 2) to permit flow between the circumference of the poppet 58 and the poppet-valve flow passage 94 past the second bearing surface 98 when the poppet valve 60 is unseated. The illustrated second bearing surface 98 is provided with a flat or straight section 106 oriented in alignment, that is generally parallel, with the flat section 104 of the first bearing surface 96 and extends the full axial length of the second bearing surface 98. It is noted that the second bearing surface 98 can be adapted to form the flow path 104 in other manners such as, for example, a plurality of flat sections or one or more flutes.

The poppet valve element 60 is formed between the first and second bearing surfaces 96, 98 and is sized and shaped to cooperate with the poppet valve seat 56 of the collar 54 to sealingly close the poppet-valve flow passage 94 to prevent refrigerant flow therethrough when the poppet valve element 60 engages the poppet valve seat 56. The illustrated poppet valve element 60 includes a generally frusto-conically-shaped surface sized for engaging a cooperating frusto-conically-shaped surface of the valve seat 56. The poppet 58 is preferably provided with a relief, that is a reduced diameter portion, located between the poppet valve element 60 and the second bearing surface 98 for ensuring adequate seating of the poppet valve element 60 onto the poppet valve seat 56. It is noted that the cooperating poppet valve seat and valve element 56, 60 can take other forms within the scope of the present invention. It is also noted that the expansion valve 22 can be alternatively designed so that the poppet 58 carries the poppet valve seat 56 and the collar 54 forms the poppet valve element 60.

The poppet 58 forms a fifth flow passage which is a third orifice or restriction 108 that axially extends through the poppet 58 and is generally coaxial with the passageway 66. The third restriction 108 is sized and shaped to restrict and control refrigerant flow through the passageway 66 of the body 38 when the expansion valve 22 is in the mid-flow condition as described in more detail hereinbelow. The upstream end of the poppet 58 is preferably provided with a seat 110 for cooperating with the poppet biasing member 61. The illustrated poppet 58 is provided with a reduced diameter portion at its downstream end to form the seat 110 which is sized and shaped for receiving and/or supporting and end of the poppet biasing member 61. The poppet 58 can be formed of any suitable which is known to those skilled in the art.

The illustrated poppet biasing member 61 is located within the body passageway 66 between and engaging the restrictor 40 and the poppet 58. The poppet biasing member 61 is adapted for resiliently biasing or urging the poppet 58 in a upstream direction toward the collar 54, that is, toward the poppet valve seat 56, to engage the poppet valve element 60 with the poppet valve seat 56 and close the poppet-valve flow passage 94. The poppet biasing member 61 is preferably a helical coil compression spring but other types biasing means and/or springs can be utilized within the scope of the present invention such as, for example, tension springs, leaf springs, fluid springs, and the like. The poppet biasing member 61 is sized to unseat the poppet valve element 60 at a predetermined "pop-off" or "blow-off" pressure drop across the expansion valve 22. The position of the poppet 58 is controlled by refrigerant inlet and outlet pressures (Pin, Pout) at the expansion valve 22. It should be appreciated that the desired pressure can be obtained by proper sizing of various design variables such as the area of exposed ends of the poppet 58 and the force of the poppet biasing member 61.

During normal operation of the refrigeration system, the expansion valve 22 is typically in the mid-flow condition (best shown in FIG. 2) wherein the solenoid coil 80 is de-energized and the pressure drop across the expansion valve 22 is relatively low, that is, the pressure drop is below the predetermined blow-off pressure. The expansion valve 22 is in the mid-flow condition at relatively low pressure drops because the poppet biasing member 61 urges the poppet 58 in an upstream direction to engage the poppet valve element 60 against the poppet valve seat 56 and close the poppet-valve flow passage 94. Also, the plunger biasing member 48 urges the plunger 44 in a downstream direction to disengage the plunger valve element 46 from the plunger valve seat 42 to open the plunger-valve flow passage 74. When the expansion valve 22 is in this mid-flow condition, refrigerant enters the expansion valve 22 through the inlet port 62 and successively flows through the third restriction 108 formed by the poppet 58, the central chamber 92 located between the restrictor 40 and the collar 54, the first restriction 68 formed by the restrictor 40, the combined paths of the plunger-valve flow passage 74 and the second restriction 76 formed by the plunger 44 (which are generally connected in parallel), and the opening 90 formed by the end stop 52 to the outlet port 64 of the expansion valve 22. It is noted that refrigerant flows generally in parallel through the second restriction 76 and the plunger-valve flow passage 74 because the plunger-valve element 46 is disengaged from the plunger valve seat 42 to open the plunger-valve flow passage 74. Refrigerant does not flow through the poppet-valve flow passage 94 because the poppet valve element 60 is seated against the poppet valve seat 56 to close the poppet-valve flow passage 94. While in this low-flow condition, refrigerant flow is controlled by the third restriction 108. The third restriction 108 is sized to restrict flow relative to the first restriction 68 and the combination of the second restriction 76 and the plunger-valve flow passage 74, that is, the third restriction 108 has a higher resistance to refrigerant flow than the first restriction 68 or the combination of the second restriction 76 and the plunger-valve flow passage 74. The third restriction 108 is sized as required for the particular flow requirements of the refrigeration system 100.

When the controller determines that a lower refrigerant flow rate through the expansion valve 22 is desired, the expansion valve 22 is changed to the low-flow condition (best shown in FIG. 3) by energizing the solenoid coil 80. The expansion valve 22 is in the low-flow condition when the solenoid coil 80 is energized because the solenoid coil 80 moves the plunger 44 in an upstream direction to engage the plunger valve element 46 against the plunger valve seat 42 and close the plunger-valve flow passage 74. When the expansion valve 22 is in this low-flow condition, refrigerant enters the expansion valve 22 through the inlet port 62 and successively flows through the third restriction 108 formed by the poppet 58, the central chamber 92 located between the restrictor 40 and the collar 54, the first restriction 68 formed by the restrictor 40, the second restriction 76 formed by the plunger 44, and the opening 90 formed by the end stop 52 to the outlet port 64 of the expansion valve 22. Refrigerant does not flow through the plunger-valve flow passage 74 because the plunger valve 46 is seated against the plunger valve seat 42 to close the plunger-valve flow passage 74. While in this low-flow condition, refrigerant flow is controlled by the second restriction 76. The second restriction 76 is sized to restrict flow relative to the first restriction 68 and the third restriction 108, that is, the second restriction 76 has a higher resistance to refrigerant flow than the first restriction 68 or the third restriction 108. The second restriction 68 is sized as required for the particular flow requirements of the refrigeration system 10. It is noted that the expansion valve 22 is in the low-flow condition regardless of the condition of the poppet 58 because the second restriction 76 controls refrigerant flow through the expansion valve 22 regardless of whether the poppet-valve flow passage 94 is open or closed.

When the pressure drop across the expansion valve 22 rises to a relatively high level, that is, rises to the predetermined blow-off pressure, the expansion valve automatically changes to the high-flow or pressure relief condition (best shown in FIG. 4) The expansion valve 22 is in the high-flow condition at relatively high pressure drops because the inlet pressure (Pin) acting on the poppet 58 overcomes the combined force of the poppet biasing member 61 and the outlet pressure (Pout) acting on the poppet 58 to move the poppet 58 in the downstream direction and disengage the poppet valve element 60 from the poppet valve seat 56 to open the poppet-valve flow passage 94. When the expansion valve 22 is in this high-flow condition, refrigerant enters the expansion valve 22 through the inlet port 62 and successively flows through the combined flow paths of the poppet-valve passage 94 and the third restriction 108 (which are generally connected in parallel), the central chamber 92 located between the restrictor 40 and the collar 54, the first restriction 68 formed by the restrictor 40, the combined flow paths of the plunger-valve flow passage 74 and the second restriction 76 formed by the plunger 44 (which are generally connected in parallel), and the opening 90 formed by the end stop 52 to the outlet port 64 of the expansion valve 22. It is noted that refrigerant flows through the plunger-valve flow passage 74 and the second restriction 76 in parallel because the plunger valve element 46 is unseated from the plunger valve seat 42 to open the plunger-valve flow passage 74. It is noted that refrigerant flows through the poppet-valve flow passage 94 and the third restriction 108 in parallel because the poppet valve element 60 is unseated from the poppet valve seat 56 to open the poppet-valve flow passage 94. While in this high-flow condition, refrigerant flow through the expansion valve 22 is controlled by the first restriction 68. The first restriction 68 is sized to restrict refrigerant flow relative to the combination of poppet-valve flow passage 94 and third restriction 108 and the combination of the plunger-valve flow passage 74 and the second restriction 76, that is, the first restriction 68 has a higher resistance to refrigerant flow than the combination of the poppet-valve flow passage 94 and third restriction 108 and the combination of the plunger-valve flow passage 74 and the second restriction 76. The first restriction 68 is sized as required for the particular flow requirements of the refrigeration system 10.

When the pressure drop across the expansion valve 22 drops to a relatively low level, that is, drops below the predetermined blow-off pressure to a re-set pressure, the expansion valve 22 automatically changes to the mid-flow condition (or remains in the low-flow condition if the solenoid coil 80 is energized). As best shown in FIG. 2, the expansion valve 80 is in the low-flow condition at relatively low pressure drops because the inlet pressure (Pin) acting on the poppet 58 is overcome by the combined force of the poppet biasing member 61 and the outlet pressure (Pout) acting on the poppet 58 and the poppet 58 moves in the upstream direction and engages the poppet valve element 60 with the poppet valve seat 56 to close the poppet-valve flow passage 94.

It is apparent from the above description that the expansion valve is automatically operable between three flow conditions: (1) the mid-flow condition, wherein the solenoid coil 80 is de-energized to place the plunger valve element 46 in a first or open position and the pressure head is relatively low to keep the poppet valve element 60 in a first or closed position, so that the third restriction 108 controls refrigerant flow through the expansion valve 22; (2) the low-flow condition, wherein the solenoid coil 80 is energized to place the plunger valve element 46 in a second or closed position and the pressure head is relatively low to keep the poppet valve element 60 in the closed position, so that the second restriction 76 controls refrigerant flow through the expansion valve 22; and (3) the high-flow condition, wherein the solenoid coil 80 is de-energized to place the plunger valve element 46 in the open position and the pressure head is relatively high to place the poppet valve element 60 is in a second or open position, so that the first restriction 68 controls refrigerant flow through the expansion valve 22. It should be appreciated that the first restriction 48 has a lower resistance to flow than the third restriction 108 which has a lower restriction to flow than the second restriction 76. It is noted that operation of the expansion valve 22 between the three flow conditions is controlled by both a control signal to the valve actuator 50 and the inlet and outlet pressures (Pin, Pout) of the expansion valve 22 in that it is the valve actuator 50 which moves the plunger 44 (along with the plunger biasing member 48) and it is fluid pressure which moves the poppet 58 (along with the poppet biasing member 61). It is also apparent from the above description that the expansion valve 22 can be designed for a desired blow-off pressure suitable for a particular refrigeration system 10. One skilled in the art appreciates that the blow-off pressure is primarily controlled by the spring force of the poppet biasing member 61 and the surface areas of the poppet 58 which are exposed to fluid pressure.

Although particular embodiments of the present invention have been described in detail, it will be understood that the present invention is not limited correspondingly in scope, but includes all changes and modifications coming within the spirit and terms of the claims.

What is claimed is:

1. A refrigerant flow-control valve operable between a mid-flow condition, a low-flow condition, and a high-flow condition, said valve comprising:

a body having an inlet and an outlet and forming a refrigerant passageway extending from said inlet to said outlet, said passageway having first, second, and third restrictions and first and second valve-element flow passages adapted such that refrigerant flows through said first valve-element flow passage generally in parallel with said second restriction, refrigerant flows through said second valve-element passage generally in parallel with said third restriction, and refrigerant flows through said first restriction generally in series with said first valve-element flow passage and said second restriction and generally in series with said second valve-element flow passage and said third restriction;

a first valve element within said body and movable between a first position closing said first valve-element flow passage to generally prevent refrigerant flow therethrough and a second position opening said first valve-element flow passage to permit refrigerant flow therethrough;

a first biasing member within said body and resiliently urging said first valve element into said second position;

a second valve element within said body and movable between a first position closing said second valve-element flow passage to generally prevent refrigerant flow therethrough and a second position opening said second valve-element flow passage to permit refrigerant flow therethrough; and a second biasing member within said body and resiliently urging said second valve element into said first position.

2. A refrigerant flow-control valve according to claim 1, wherein said second valve element is carried by a poppet and said poppet forms said third restriction.

3. A refrigerant flow-control valve according to claim 1, wherein said poppet is adapted to selectively move said first valve element to said second position in response to a pressure head across said flow-control valve.

4. A refrigerant flow-control valve according to claim 1, wherein said second valve element is carried by a plunger and said plunger forms said third restriction.

5. A refrigerant flow-control valve according to claim 4, further comprising a valve actuator adapted to selectively move said first valve element to said first position in response to a control signal supplied thereto.

6. A refrigerant flow-control valve according to claim 5, wherein said valve actuator includes a solenoid coil located adjacent said plunger.

7. A refrigerant flow-control valve according to claim 4, wherein said second valve element is carried by a poppet and said poppet forms said third restriction.

8. A refrigerant flow-control valve according to claim 7, wherein said poppet is adapted to selectively move said first valve element to said second position in response to a pressure head across said flow-control valve.

9. A refrigerant flow-control valve according to claim 1, wherein said third restriction is adapted to have a higher resistance to flow than said second restriction and said second restriction is adapted to have a higher resistance to refrigerant flow than said first restriction.

10. A refrigerant flow-control valve according to claim 1, wherein said first restriction is located downstream of said third restriction and said second restriction is located downstream of said first restriction.

11. A refrigerant flow-control valve according to claim 1, wherein said first restriction is formed by a restrictor, said first valve-element flow passage is formed by said body and downstream from said restrictor, and said second restriction is formed by a plunger carrying said first valve element and located at least partially downstream of said restrictor, said second valve-element flow passage is formed by a collar spaced-apart and upstream from said restrictor, and said third restriction is formed by a poppet carrying said second valve element and located at least partially between said restrictor and said collar.

12. A refrigerant flow-control valve according to claim 11, wherein said first biasing member is a compression spring having one end seated against said restrictor and another end seated against said plunger and said second biasing member is a compression spring having one end seated against said restrictor and another end seated against said poppet.

13. A refrigerant flow-control valve according to claim 11, wherein said second valve-element flow passage is generally circular in cross-section, said poppet has a generally cylindrically-shaped bearing surface adapted to cooperate with said second valve-element flow passage, and said bearing surface is adapted to form a flow path to permit refrigerant flow through said valve-element flow passage with said bearing surface therein.

14. A refrigerant flow-control valve according to claim 13, wherein said passageway is generally circular in cross-section between said collar and said restrictor, said poppet has a generally cylindrically-shaped second bearing surface cooperating with said passageway between said restrictor and said collar, and said bearing surface is adapted to form a second flow path to permit refrigerant flow through said passageway with said second bearing surface therein.

15. A refrigerant flow-control valve according to claim 11, wherein said passageway is generally circular in cross-section between said collar and said restrictor, said poppet has a generally cylindrically-shaped bearing surface cooperating with said passageway between said restrictor and said collar, and said bearing surface is adapted to form a flow path to permit refrigerant flow through said passageway with said bearing surface therein.

16. A refrigerant flow-control valve according to claim 11, wherein a portion of said passageway is generally circular in cross-section downstream of said restrictor, said plunger has a generally cylindrically-shaped bearing surface cooperating with said portion of said passageway, and said bearing surface is adapted to form said first valve-element flow passage between said portion of said passageway and said bearing surface to permit refrigerant flow through said first valve-element flow passage.

17. A refrigerant flow-control valve according to claim 1, wherein said body is a generally straight tube and said first restriction is formed by a cylindrically-shaped restrictor secured within said tube, said first valve-element passage is formed between said tube and a cylindrically-shaped plunger located within said tube, said second restriction is formed by plunger carrying said first valve, said second valve-element passage is formed by a cylindrically-shaped collar secured within said tube and spaced-apart from said restrictor, and said third restriction is formed by a poppet carrying said second valve element and located within said tube at least partially between said restrictor and said collar.

18. A refrigerant flow-control valve according to claim 17, wherein said first biasing member is compression spring located within said tube and having one end seated against said restrictor and another end seated against said plunger and said second biasing member is compression spring located within said tube and having one end seated against said restrictor and another end seated against said poppet.

19. A refrigerant flow-control valve operable between mid-flow condition, a low-flow condition, and a high-flow condition, said valve comprising:

a tubular-shaped body having an inlet and an outlet and forming a refrigerant passageway extending from said inlet to said outlet;

a cylindrically-shaped restrictor secured within said tube and forming a first restriction;

a cylindrically shaped end stop secured within said tube and spaced-apart from said restrictor;

a plunger within said tube at least partially between said restrictor and said end stop and said plunger forming a first valve-element flow passage between said plunger and said tube, said plunger carrying a first valve element and movable between a first position closing said first valve-element flow passage to generally prevent refrigerant flow therethrough and a second position opening said first valve-element flow passage to permit refrigerant flow therethrough, said plunger forming a second restriction generally connected in parallel with said first valve-element flow passage and generally connected in series with said first restriction, said second restriction having a greater resistance to refrigerant flow than said first restriction;

a first biasing member within said tube and resiliently urging said first valve element into said second position;

a valve actuator adapted to selectively move said first valve element to said first position in response to a control signal supplied thereto;

a cylindrically-shaped collar secured within said tube and forming a second valve-element flow passage, said collar being spaced-apart from the restrictor;

a poppet within said tube at least partially between said restrictor and said collar and carrying a second valve element, said poppet movable between a first position closing said second valve-element flow passage to generally prevent refrigerant flow therethrough and a second position opening said second valve-element flow passage to permit refrigerant flow therethrough, said poppet forming a third restriction generally connected in parallel with said second valve-element flow passage and generally connected in series with said first restriction, said third restriction having a greater resistance to refrigerant flow than said first restriction and a lesser resistance to flow than said second restriction, said poppet being adapted to automatically move said second valve element to said second position in response to a pressure head across said flow-control valve; and a second biasing member within said tube and resiliently urging said second valve element into said first position.

20. A refrigerant flow-control valve according to claim 19, wherein. said first biasing member is compression spring located within said tube and having one end seated against said restrictor and another end seated against said plunger and said second biasing member is compression spring located within said tube and having one end seated against said restrictor and another end seated against said poppet.

21. A refrigeration system having a compressor, a condenser, and a evaporator connected in series and an expansion valve connected in series between the condenser and the evaporator, said refrigeration system comprising:

a body having an inlet and an outlet and forming a refrigerant passageway extending from said inlet to said outlet, said passageway having first, second, and third restrictions and first and second valve-element flow passages adapted such that refrigerant flows through said first valve-element flow passage generally in parallel with said second restriction, refrigerant flows through said second valve-element passage generally in parallel with said third restriction, and refrigerant flows through said first restriction generally in series with said first valve-element flow passage and said second restriction and generally in series with said second valve-element flow passage and said third restriction;

a first valve element within said body and movable between a first position closing said first valve-element flow passage to generally prevent refrigerant flow therethrough and a second position opening said first valve-element flow passage to permit refrigerant flow therethrough;

a first biasing member within said body and resiliently urging said first valve element into said second position;

a second valve element within said body and movable between a first position closing said second valve-element flow passage to generally prevent refrigerant flow therethrough and a second position opening said second valve-element flow passage to permit refrigerant flow therethrough; and a second biasing member within said body and resiliently urging said second valve element into said first position.

22. A method of delivering refrigerant from a high pressure region to a low pressure region of a refrigeration system through a variable dimension passageway to expand the refrigerant as it enters the low pressure region, said method comprising the steps of:

(a) coupling the high and low pressure regions through a valve body having an inlet and an outlet and forming a refrigerant passageway extending from the inlet to the outlet, the passageway having first, second and third restrictions and first and second valve-element flow passages adapted such that refrigerant flows through the first valve-element flow passage generally in parallel with the second restriction, refrigerant flows through the second valve-element flow passage in parallel with the third restriction, and refrigerant flows through the first restriction generally in series with the first valve-element flow passage and the second restriction and generally in series with the second valve-element flow passage and the third restriction;

(b) mounting a first valve element within the valve body such that the first valve element is movable between a first position closing the first valve-element flow passage to generally prevent refrigerant flow therethrough and a second position opening the first valve-element flow passage to permit refrigerant flow therethrough;

(c) biasing the first valve element into the second position;

(d) selectively moving the first valve element to the first position in response to a control signal supplied thereto;

(e) mounting a second valve element within the valve body such that the second valve element is movable between a first position closing the second valve-element flow passage to generally prevent refrigerant flow therethrough and a second position opening the second valve-element flow passage to permit refrigerant flow therethrough;

(f) biasing the second valve element into the first position; and (g) automatically moving the second valve element to the second position in response to a predetermined fluid pressure acting against the bias.

* * * * *